United States Patent
Liu et al.

(10) Patent No.: US 8,282,856 B2
(45) Date of Patent: Oct. 9, 2012

(54) METHOD FOR SINTERING LITHIUM CONTAINED ELECTRODE MATERIAL

(75) Inventors: Wen-Chih Liu, Taichung (TW);
Shinn-Dar Wu, Taichung (TW);
Che-Chen Lin, Taichung (TW)

(73) Assignee: Harmony Brother Co., Ltd., Taichung (TW)

( * ) Notice: Subject to any disclaimer, the term of this patent is extended or adjusted under 35 U.S.C. 154(b) by 215 days.

(21) Appl. No.: 12/789,468

(22) Filed: May 28, 2010

(65) Prior Publication Data
US 2011/0291041 A1  Dec. 1, 2011

(51) Int. Cl.
*H01M 4/88* (2006.01)
(52) U.S. Cl. ............... 252/182.1; 252/500; 423/311; 423/594.4; 423/599; 429/224
(58) Field of Classification Search ............... 252/500, 252/182.1; 423/599, 311, 594.4; 429/224
See application file for complete search history.

(56) References Cited

U.S. PATENT DOCUMENTS

| | | | | |
|---|---|---|---|---|
| 5,792,442 A | * | 8/1998 | Manev et al. | 423/599 |
| 6,403,257 B1 | * | 6/2002 | Christian et al. | 429/224 |
| 2001/0025946 A1 | * | 10/2001 | Manev et al. | 252/500 |
| 2007/0003834 A1 | * | 1/2007 | Gao et al. | 429/224 |

* cited by examiner

*Primary Examiner* — Khanh Tuan Nguyen
(74) *Attorney, Agent, or Firm* — Muncy, Geissler, Olds & Lowe, PLLC

(57) ABSTRACT

A method for sintering lithium contained electrode material includes: depositing a mixture of a particle like lithium compound and a substance M in a metal container, where M is a chemical element selected from a group consisting of iron (Fe), phosphor (P), cobalt (Co), nickel (Ni), manganese (Mn), vanadium (V), and carbon (C), or an oxide or compound thereof; subjecting the mixture deposited in the metal container to heat treatment by heating the metal container in two phases of which temperature ranges for heating are respectively 300-700° C. and 500-900° C.; and grinding the heat-treated mixture to obtain a powder like lithium contained electrode material. According to the method of the present invention, in the process of sintering and synthesis, it is not necessary to supply an external (or a great amount of) protective gas, so that substantial reduction of processing cost and time is realized.

12 Claims, 3 Drawing Sheets

METHOD FOR SINTERING LITHIUM CONTAINED ELECTRODE MATERIAL

TECHNICAL FIELD OF THE INVENTION

The present invention generally relates to a method for sintering lithium contained electrode material, and more particularly to a method for sintering lithium contained electrode material that is applicable to a lithium-ion secondary battery.

DESCRIPTION OF THE PRIOR ART

A commonly known lithium-ion secondary battery (which will be abbreviated as lithium battery herein) shows advantages in respect of long cycle life, large current discharging, fast charging, high conversion efficient, compactness and light weight, and excellent safety and is thus prevailing in the power and energy storage markets, including the fields of portable information/electronic products, hybrid automobiles, electrical bicycles, and power tools so that it gradually takes the place of lead-acid battery and nickel hydride battery. The market demand for lithium battery is steadily increased.

The substances used in a lithium battery include positive electrode material, negative electrode material, isolation membrane, and electrolyte, among which the positive electrode material takes the highest percentage of material cost of the lithium battery. For the positive electrode, conventional lithium batteries use lithium cobalt oxide ($LiCoO_2$) as the material for positive electrode. However, the availability and cost of cobalt (Co) are getting disadvantageous recently and therefore using iron (Fe) contained substance that can be acquired easily with a low cost is used to replace cobalt (Co) contained substance is getting much attention by the industry. Among the currently used iron contained substances, lithium iron phosphate (LEP), having a chemical formula of $LiFePO_4$, shows prominent performance and is nowadays of increasing commercial use.

The lithium contained materials for positive and negative electrodes of the conventional lithium battery are subjected to a sintering process that is carried out in a regular chamber to cause reaction of the reactants with heat. In such a process, powders having high oxygen content are often protected by introducing an inert gas (such as argon (Ar) or hydrogen ($H_2$)) into the reaction chamber to prevent composition formed thereby from oxidation. For example, in a conventional sintering process of lithium iron phosphate, a great amount of protective gas must be supplied to suppress conversion of the inclusion of Fe into $Fe^{3+}$ form. This known method of applying a great amount of protective gas in a sintering process is clearly described in published patent documents, including Taiwan Patent Nos. TW 544967 and TW 200805734 and U.S. Pat. Nos. 6,716,372-B2 and 6,730,281. Apparently, the consuming protective gases, such as Ar and $H_2$, take quite a percentage of the cost in sintering lithium iron phosphate.

Further, in the sintering process of the conventional lithium battery, the container adopted for the materials is often a high purity aluminum oxide crucible, which is subjected to certain constrains and limitation in the use thereof. One is that the tightness of engagement between the crucible and a cover cannot be ensured after manufactured. The other is that temperature inconsistence between the protective gas and crucible that is induced in a cooling process may break the aluminum oxide crucible. Further, cracking is easily caused in the aluminum oxide crucible when it is subjected to rapid reduction of temperature and thus it must take a long time for annealing, making it hard to reduce the consumed amount of protective gas and the time cost of the operation hours of the sintering process.

SUMMARY OF THE INVENTION

The primary objective of the present invention is to provide a method for sintering lithium contained electrode material, which requires no addition of external (or a great amount of) protective gases in the sintering process and which effectively reduces the operation time cost, making it particularly fit for industrial utilization.

To achieve the above objective, the present invention provides a method for sintering lithium contained electrode material, comprising: depositing a mixture of particle like lithium compound and substance M in a cover-closed metal container, where M is a chemical element of iron (Fe), phosphor (P), cobalt (Go), nickel (Ni), manganese (Mn), vanadium (V), and carbon (C), or an oxide or compound thereof; subjecting the mixture deposited in the metal container to heat treatment by heating the metal container in two phases of which the temperature ranges for heating are respectively 300-700° C. and 500-900° C.; and grinding the heat-treated mixture to obtain a powder like lithium contained electrode material.

In the above described method of sintering lithium contained electrode material, the temperature range (300-700° C.) of the first heating phase is used for synthesis of the powders, separation of unknown gases, and formation of primary particle size, while the temperature range (500-900° C.) of the second heating phase is for sintering irregular broken edges or fracture of the powders. During the sintering, the substances take reaction and release gases of carbonate and other products. Due to local air tightness, these gases remain inside the metal container and form internal pressure for protection, whereby invasion of external gas is blocked. Consequently, the substances are protected from contacting other known substances and oxygen, which may lead to undesired unstable compounds, in the course of reaction. During the course of sintering, when temperature rises, surface oxidation of the metal container and metal thermal expansion induce a protection layer on the outer side of the metal container for further non-oxidation protection of the inside powder material, especially iron (Fe) contained powders. In this way, the objective of supplying no external (or a great amount of) protective gas in the sintering process can be realized.

According to an embodiment of the present invention, the sintering method comprising: depositing a mixture of particle like lithium compound and substance M in a metal container; subjecting the mixture deposited in the metal container to heat treatment by heating the metal container in a temperature range of 300-700° C.; grinding the mixture so heat-treated; further subjecting the ground mixture to heat treatment in a temperature range of 500-900° C.; and further grinding the heat-treated mixture to obtain a powder like lithium contained electrode material. The powders obtained with such a multiple phase heating and sintering process mostly grow as individual particles.

According to another embodiment of the present invention, the sintering method comprising: depositing a mixture of particle like lithium compound and substance M in a metal container; subjecting the mixture deposited in the metal container to heat treatment by heating the metal container with consecutive and varied temperature ranges of 300-700° C. and 500-900° C.; and grinding the heat-treated mixture to obtain a powder like lithium contained electrode material.

The powders obtained with such a consecutive multiple phase heating and sintering process shows a single powder structure of a plurality of tiny particles aggregated together.

According to the sintering method of the present invention, since sintering of material is carried out in a cover-closed metal container, several advantages over the conventional high purity aluminum oxide crucible are provided. The first is that the metal container of the present invention can be made in diverse forms for various applications to effectively control the tightness of engagement between the metal container and the cover, thereby ensuring consistence of temperature inside the metal container for stable heating and helping control the consistence of particle size for a batch of sintered material. The second is that through surface oxidation of the metal container and metal thermal expansion in the sintering process, a protection layer is formed on an outer side of the container, which provides additional non-oxidation protection for the inside materials. The third is that no cracking may occur even under the condition of fast reduction of temperature, so that forced temperature reduction can be applied to shorten the time period of annealing to result in reduction of operation time.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The present invention provides a method for sintering lithium iron phosphate, comprising: depositing a mixture of particle like lithium compound and substance M in a cover-closed metal container; where M is a chemical element of iron (Fe), phosphor (P), cobalt (Co), nickel (Ni), manganese (Mn), vanadium (V), and carbon (C), or an oxide or compound thereof; subjecting the mixture deposited in the metal container to heat treatment by heating the metal container in two phases of which the temperature ranges for heating are respectively 300-700° C. and 500-900° C.; and grinding the heat-treated mixture to obtain a powder like lithium contained electrode material.

In the above described method, the temperature range 300-700° C. for heat treatment of the first phase is used for synthesis of the powders, separation of unknown gases, and formation of primary particle size, while the temperature range 500-900° C. for heat treatment of the second phase is for sintering irregular broken edges or fracture of the powders. The two phases of heating can be carried in a separated multi-phase manner or they can be carried in a consecutive multi-phase manner and the power like lithium contained electrode materials so obtained is different from each other according to the different ways of heating.

Figure 1:
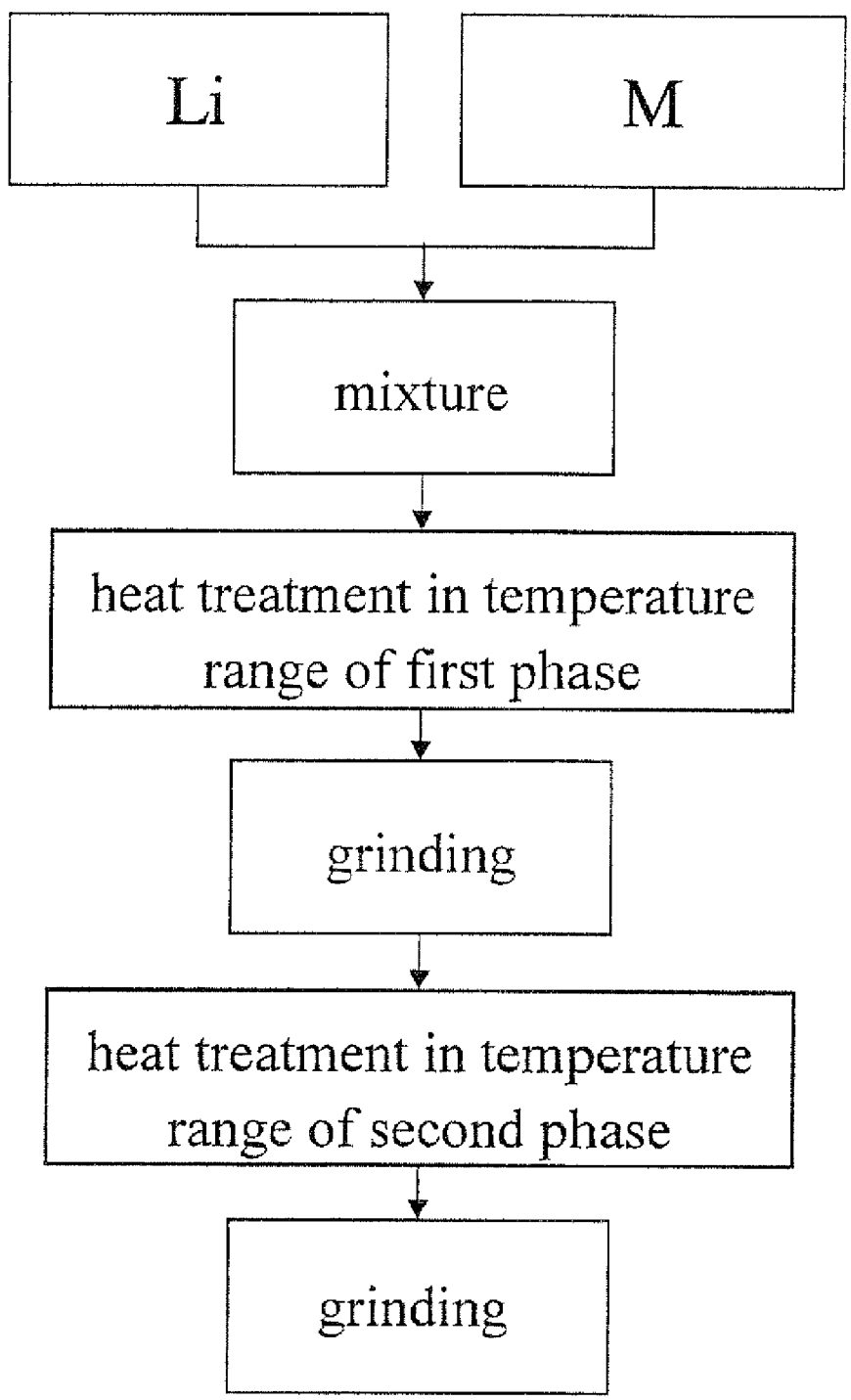
FIG. 1 is a flow chart illustrating a sintering and heating process featuring separated multi-phase heating according to the present invention.

As shown in FIG. 1, the present invention provides a method for sintering lithium container electrode material, of which an embodiment comprises: depositing a mixture of particle like lithium compound and the substance M in a cover-closed metal container; subjecting the mixture deposited in the metal container to heat treatment by heating the metal container in a temperature range of 300-700° C.; grinding the heat-treated mixture; further subjecting the ground mixture to heat treatment in a temperature range of 500-900° C.; and further grinding the heat-treated mixture to obtain a powder like lithium contained electrode material. The powders obtained with such a separated multiple-phase heating and sintering process mostly grow as individual particles.

Figure 2:
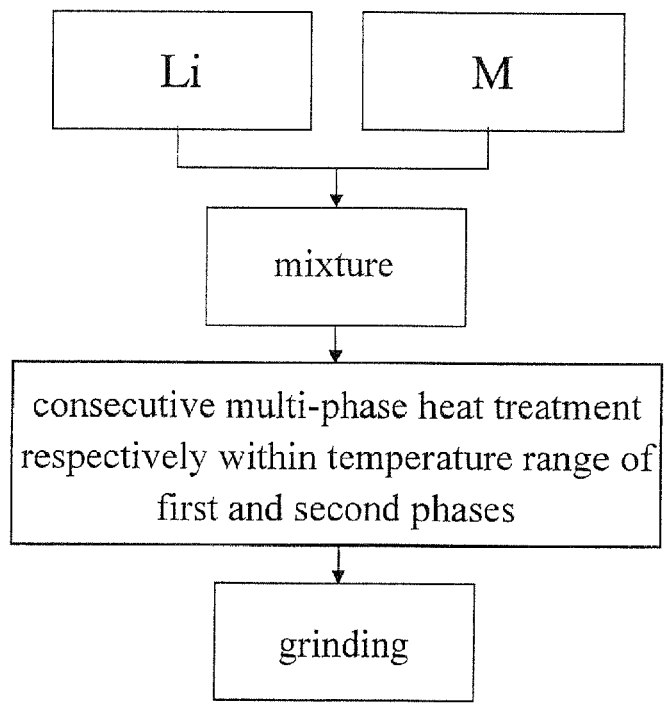
FIG. 2 is a flow chart illustrating a sintering and heating process featuring consecutive multi-phase heating according to the present invention.
Figure 3:
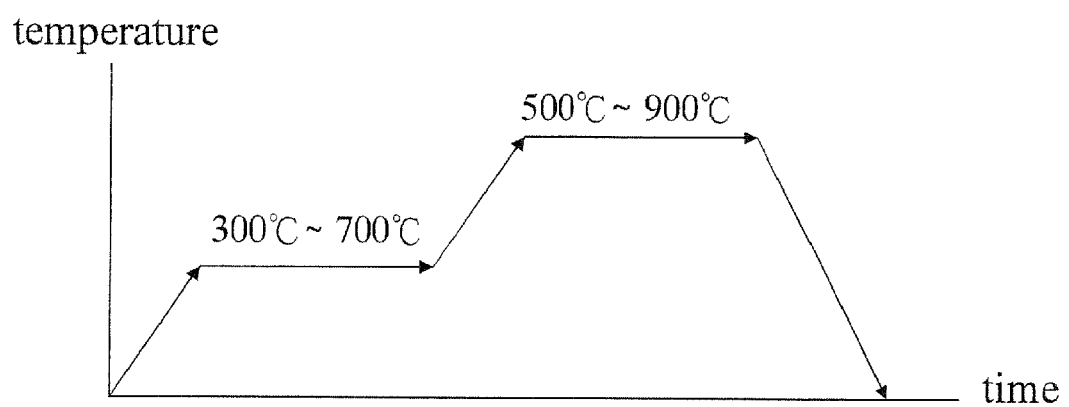
FIG. 3 is a plot showing an example of temperature variation applied in the consecutive multi-phase heating according to the process of FIG. 2.

As shown in FIGS. 2 and 3, the method for sintering lithium contained electrode material according to another embodiment comprises: depositing a mixture of particle like lithium compound and the substance M in a cover-closed metal container; subjecting the mixture deposited in the metal container to heat treatment by heating the metal container with consecutive and varied temperature ranges of 300-700° C. and 500-900° C.; and grinding the heat-treated mixture to obtain a powder like lithium contained electrode material. The powders obtained with such a consecutive multiple-phase heating and sintering process shows a single powder structure of a plurality of tiny particles aggregated together.

The present invention is a method of solid-state sintering of powders and the lithium contained electrode material manufactured with this method include materials for positive electrode of lithium battery, including lithium cobalt oxides ($LiCoO_2$), lithium manganese oxides ($LiMnO_2$), lithium nickel oxides ($LiNiO_2$), lithium iron phosphate ($LiFePO_4$), and lithium nickel cobalt manganese oxides ($Li(NiCoMn)O_2$), and material for negative electrode of lithium battery, including $Li_4Ti_5O_{12}$, $LiC_6$, and $LiSnO_x$.

Figure 4:
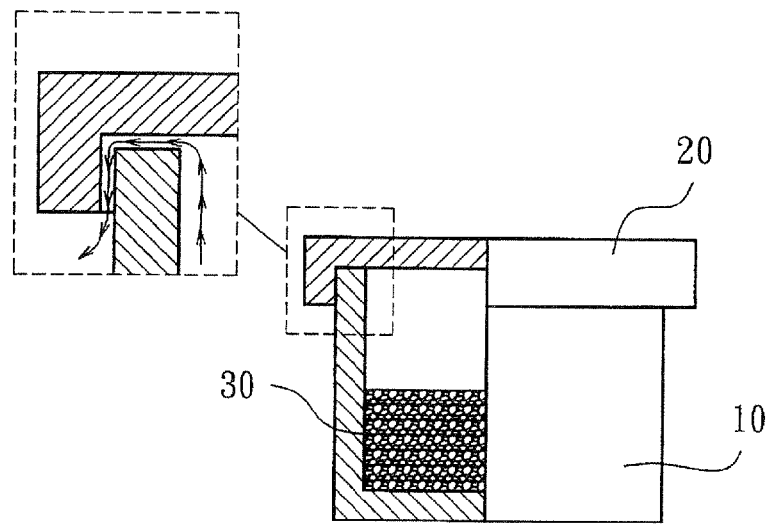
FIG. 4 illustrates formation of internal pressure protection in a metal container adopted in the present invention.
Figure 5:
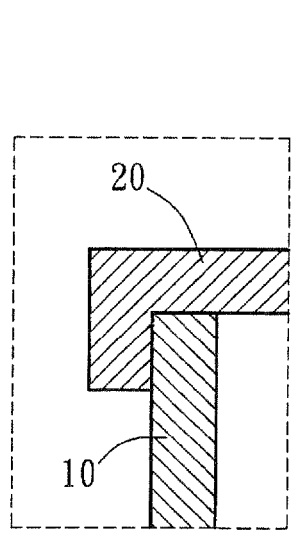
FIG. 5 illustrates the formation of a protection layer on an outer side of the metal container adopted in the present invention.

During the course of sintering and synthesis of material, as shown in FIG. 4, the mixture 30 deposited in the metal container 10, when carrying out reaction, generates gases of carbonate and other products. The cover 20 of the metal container 10 is also affected by the heat so that gaseous molecules around the cover 20 are heated and temperature rises. The gaseous molecules of both sides induce circulation flows. Since the metal container 10 has a fixed internal volume, the internal pressure increases with the rise of temperature, whereby when the internal pressures exceeds the external pressure, gas is driven to flow toward the outside that has a lower pressure (as indicated by arrows shown in the drawing) and is thus discharged outward through a gap between metal container 10 and the cover 20 to eventually reaching fluid static balance, by which air that is contained in the metal container 10 is expelled outward and protection realized by internal pressure is provided. In this way, the material 30 is protected, during the reaction, from contacting other known substances and oxygen, which may lead to undesired unstable compounds. Further, as shown in FIG. 5, during the course of sintering, when temperature rises, oxidation characteristics of the metal container 10 and metal thermal expansion of the cover 20 realize tight engagement to thereby induce a protection layer on the outer side of the metal container 10 for further non-oxidation protection of the inside material, especially iron (Fe) contained powders. In this way, the objective of supplying no external (or a great amount of) protective gas in the sintering method according to the present invention can be realized.

For example, in an embodiment of the present invention, the substances used in the sintering and synthesis process include lithium carbonate ($Li_2CO_3$), lithium hydroxide (LiOH), iron phosphate ($FePO_4$), and graphite (C). The reaction products and other products of the sintering process as shown in the following chemical equation (4-1) and (4-2):

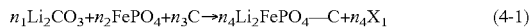

$$n_1Li_2CO_3 + n_2FePO_4 + n_3C \rightarrow n_4Li_2FePO_4 - C + n_4X_1 \quad (4\text{-}1)$$

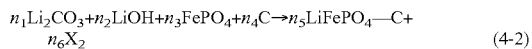

$$n_1Li_2CO_3 + n_2LiOH + n_3FePO_4 + n_4C \rightarrow n_5LiFePO_4 - C + n_6X_2 \quad (4\text{-}2)$$

where $n_x$ indicates synthesis percentage of reaction, and $X_1$ and $X_2$ are other reaction products, of which $X_1$ may include $CO_2$ and CO and $X_2$ may include $CO_2$, CO, and $H_2O$.

From the above equations, it is appreciated that in the sintering process, since the substance X1 and X2 may provide an internal pressure protection effect, which blocks the invasion of external gas from entering the sintered body, excellent protection can be obtained for the sintering of powder having high oxygen contents.

Figure 6:
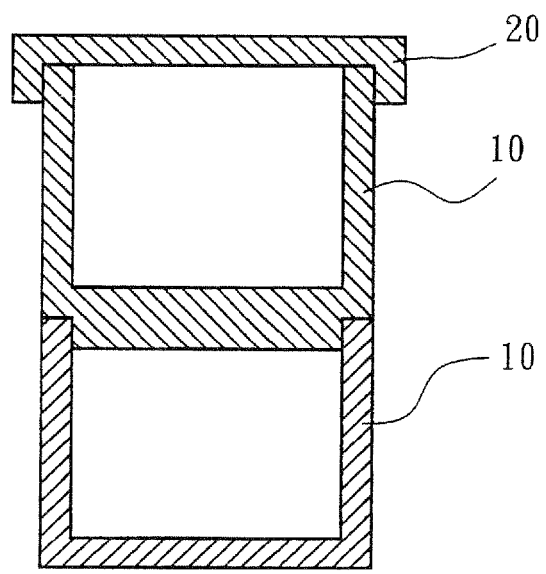
FIG. 6 shows a modification of the arrangement of the metal container of the present invention in which multiple metal containers are vertically stacked for heating.

In the above description, the metal container 10 and the cover 20 used can be made of metallic materials that are identical or different ferrous metals or nonferrous metals, whereby no cracking may occur even in rapid reduction of temperature and forced temperature reduction can be applied to shorten the time period of annealing to result in reduction of operation time cost. The jointing site between the metal container 10 and the cover 20 can be formed as joint surfaces that can mate each other to ensure proper control of tightness of engagement when the cover is closed. In an embodiment, as shown in FIG. 6, the metal container 10 can be arranged in a form of multiple containers that are lined up or vertically stacked for the purpose of heating. When the multiple containers are vertically stacked, the bottom of an upper side container can serve as a cover for a lower side container.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A method for sintering lithium contained electrode material, comprising:
    depositing a mixture of a particle like lithium compound and a substance M in a cover-closed metal container with a tightness of engagement therebetween, where M is a chemical element selected from a group consisting of iron (Fe), phosphor (P), cobalt (Co), nickel (Ni), manganese (Mn), vanadium (V), and carbon (C), or an oxide or compound thereof;
    subjecting the mixture deposited in the cover-closed metal container to heat treatment by heating the cover-closed metal container in a first heating phase with a first temperature of 300-700° C. and a second heating phase with a second temperature of 500-900° C. respectively, so as to form an internal protection and an external protection to prevent the mixture from being oxidized; and
    grinding the heat-treated mixture to obtain a powder like lithium contained electrode material.

2. The method for sintering lithium contained electrode material according to claim 1, wherein said heating and said grinding further comprise:
    subjecting the mixture deposited in the cover-closed metal container to heat treatment by heating the cover-closed metal container in the first heating phase with the first temperature of 300-700°C.;
    grinding the heat-treated mixture after the first heating phase;
    subjecting the ground mixture to heat treatment in the second heating phase with the second temperature of 500-900° C.; and
    grinding the heat-treated mixture after the second heating phase to obtain a powder like lithium contained electrode material.

3. The method for sintering lithium contained electrode material according to claim 1, wherein said heating and said grinding further comprise:
    subjecting the mixture deposited in the cover-closed metal container to heat treatment by heating the cover-closed metal container in the first heating phase with the first temperature of 300-700°C.;
    subjecting the mixture to heat treatment in the second heating phase with the second temperature of 500-900° C. after the first heating phase; and
    grinding the heat-treated mixture after the second heating phase to obtain a powder like lithium contained electrode material.

4. The method for sintering lithium contained electrode material according to claim 1, wherein the substance includes lithium carbonate ($Li_2CO_3$), lithium hydroxide (LiOH), iron phosphate ($FePO_4$), and graphite (C).

5. The method for sintering lithium contained electrode material according to claim 1, wherein the cover-closed metal container comprises at least a container and a cover, and the container and the cover are made of metallic materials that are identical or different ferrous.

6. The method for sintering lithium contained electrode material according to claim 5, wherein the cover-closed metal container comprises joint sites between the container and the cover, the joints sites being made in the forms of mateable planar or raised/recessed shapes.

7. The method for sintering lithium contained electrode material according to claim 6, wherein the joint sites between the container and the cover comprise two joint surfaces.

8. The method for sintering lithium contained electrode material according to claim 5, wherein the cover-closed metal container comprises a combination of multiple containers arranged in a vertically stacked form, the cover is covered on top of the combination of multiple metal containers for heating and wherein in the vertically stacked arrangement, a bottom of an upper side container serves as a cover for a lower side container adjacent thereto.

9. The method for sintering lithium contained electrode material according to claim 8, wherein the cover-closed metal container comprises joint sites between the two adjacent containers and between the top of the container and the cover.

10. The method for sintering lithium contained electrode material according to claim 9, wherein the joint sites between the two adjacent containers and between the top of the container and the cover respectively comprise two joint surfaces.

11. The method for sintering lithium contained electrode material according to claim 1, wherein the method of sintering is conducted without introducing an inert gas.

12. The method for sintering lithium contained electrode material according to claim 1, wherein the method of sintering is conducted without introducing additional consuming gases.

* * * * *